United States Patent [19]

Ross et al.

[11] Patent Number: 5,182,842
[45] Date of Patent: Feb. 2, 1993

[54] OIL FILTER DISASSEMBLY AND RECYCLING APPARATUS

[76] Inventors: Gilbert B. Ross, 17640 Vincennes, Northridge, Calif. 91325; Charles Brittain, 10177 Elkwood, Sun Valley, Calif. 91352

[21] Appl. No.: 851,011

[22] Filed: Mar. 13, 1992

[51] Int. Cl.$^5$ .................... B23P 19/04; B67B 7/46; B23B 5/14

[52] U.S. Cl. ........................ 29/240; 29/822; 100/902; 30/434; 82/92; 82/101

[58] Field of Search ............... 29/403.3, 426.2, 426.3, 29/426.4, 801, 822, 240, DIG. 67; 100/902; 30/417, 430, 434, 441; 82/92, 101; 198/468.2, 468.5

[56] References Cited

U.S. PATENT DOCUMENTS

| | | | |
|---|---|---|---|
| 539,971 | 5/1895 | Anderson | 30/434 |
| 3,608,192 | 9/1971 | Harsel | 30/441 |
| 3,900,948 | 8/1975 | Zammeraad | 30/441 |
| 4,418,460 | 12/1983 | Ruth | 29/426.3 |
| 4,418,594 | 12/1983 | Burns, Jr. | 100/902 |
| 4,927,085 | 5/1990 | Oberg | 100/902 |
| 5,011,001 | 4/1991 | Cameron | 198/468.2 |
| 5,060,564 | 10/1991 | Buford et al. | 100/902 |
| 5,067,529 | 11/1991 | Gonzales-Miller et al. | 29/801 |
| 5,109,763 | 5/1992 | Morris et al. | 100/902 |
| 5,125,331 | 6/1992 | Wood | 100/902 |

Primary Examiner—P. W. Echols
Assistant Examiner—David P. Bryant
Attorney, Agent, or Firm—Louis J. Bachand

[57] ABSTRACT

A continuously cycling oil filter disassembly and recycle apparatus and method comprising tandem transport of filters and filter components in a given spaced relation to and from a disassembling facility where the filters are cut while rotatably retained by selectively depressible pins, and the disassembled components shifted to recycle receptacles arranged to receive the components spaced as removed from the disassembling facility.

45 Claims, 4 Drawing Sheets

OIL FILTER DISASSEMBLY AND RECYCLING APPARATUS

FIELD OF THE INVENTION

This invention relates to apparatus and method for recovering the useful components of oil filters used in automotive, truck, and other internal combustion engines. More particularly, the invention relates to a highly automated apparatus and method for the stepwise disassembly of oil filters into their component parts for recovery and recycle, as a key part of a program to gather, break-down and recycle the vast quantity of oil filters removed from service every day. The method and apparatus generate clean, pre-separated scrap components free of contamination with other components. That is, the filter elements are separate from the canisters and the heavier metal base is recovered free of the canister as well. Paper and oil do not contaminate the steel components.

BACKGROUND

Modern transportation and numerous stationary industrial engines require oil to function. The oil plays a vital role in lubricating surfaces, carrying away harmful particulate, and cooling the engine. Particulates carried in the oil are removed by cycling the oil through a filter. The typical oil filter for this purpose comprises a substantial metal base, of steel or the like, a lighter weight canister, and the filter element per se, usually a mass of fibrous material enclosed by the canister and arranged to trap particulates in the oil and separate them. The metal base is perforated to provide for oil passage into the canister. Periodic replacement of the oil is essential to engine life. At such replacement the filter is usually replaced as well. This process generates tens of millions of used filters annually. Disposal of these filters is an environmental problem. First, their oil content must be well drained. Then the oil impregnated filter element must be captured for environmentally safe disposal, and the metal components, the canister and base, directed to appropriate recyclers of these types of metal.

The problem with recovery and recycle as just outlined is that as a practical matter the gathering and processing of millions of units requires an enormous amount of labor as the units are difficult to handle, hard to disassemble, and so numerous as to overwhelm ordinary scrap recyclers.

SUMMARY OF THE INVENTION

It is an object of the invention, accordingly, to provide method and apparatus in which the disassembly of oil filters and diversion of disassembled components to appropriate recycle groups is conducted in a mechanized, repetitive way which is computer controlled and geared to vast quantities of units routinely being processed. It is a further object to provide apparatus which separates the oil filter components in an integrated fashion with disposal thereof. It is another object to provide apparatus which shifts oil filters and oil filter components from station to station without human labor input, progressively disassembling the units into components, and directing the components into separate locations for recycle without need of further separating steps. Yet another object is the provision of apparatus and method which utilizes the perforate base of the typical oil filter to drive the filter for cutting operations severing the base from the canister above the base. It is another object to carry the units and unit components on a common shuttle between stations for successive operations. A still further object is to impale the oil filters on a universal array of separately deflectable pins which extend through the perforate base in the pattern dictated by the pattern of perforations, and shifting the filter element from pin engagement by rocking the element upward off the pins. A further object is to employ magnets to shift the ferrous metal bases from their position of the pins, and to employ clamping means carried by the shuttle to shift the unit and the canister portion of the unit at separate stages of the method.

These and other objects of the invention to become apparent hereinafter are realized in a disassembly and recycling apparatus for oil filters comprising a vertically extended filter element, a downwardly open canister enclosing the filter element, and a perforated metal base fixed across the canister opening in filter element securing relation, the apparatus comprising at a severing locus a filter retaining means including pin means extending through the metal base perforations, cutting means disposed radially of the pin mean and arranged to cut the retained base free from the canister, and separate means shifting the base, canister and filter element from the apparatus to receptacles for recycling.

In this and like embodiments: there is further included positioning means positioning the oil filter to receive the pins in the filter metal base: the pin means comprises a plurality of pins opposing the filter metal base, at least two of the pins being adapted to register with and enter the perforations in the filter metal base in filter retaining relation; The pins are deflectable by the metal base when not registered with a metal base perforation to permit entry into the metal base perforations by registered pins; The pin means comprises a plurality of pins spring biased toward the filter metal base for entry into the base when in registration with perforations therein and deflection by the base when not in registration; And the plurality of pins is arranged in laterally spaced relation for retaining variously sized metal bases with different patterns of perforations, and each the pin is normally upstanding but axially deflectable against its spring bias by the metal base when not in registration with a metal base perforation.

Further, typically: The cutting means comprises a cutting blade adapted to cut through the filter canister at the canister wall adjacent the filter metal base while the filter is retained by the pin means; The cutting blade and canister wall are relatively movable for cutting the canister wall; The canister is driven arcuately about its axis by the pin means inserted in the filter metal base, and the cutting blade cuts the canister wall to sever the base from the canister. This action can be reversed with the blade moving about the canister, and partial arcs, e.g. three overlapping arcs of 140 degrees can be used rather than the preferred 360 degree rotation.

Preferably, then, in this embodiment, the filter moves through at least one rotation with the cutting means in cutting engagement therewith. Typically, the cutting means comprises a cutting blade, and there is further included a rotatable stage supporting the pin means, the stage being rotatable, and drive means including a shaft and motor driving the stage during cutting engagement of the cutting blade with the canister wall.

With specific reference to the shifting means, typically it includes a metal base shifting means comprising means to engage the metal base, the engaging means being shiftable translationally in metal base engaged relation for engaging and translationally shifting the metal base from the severing locus to the receptacle for base recycling, the base engaging means optimally comprising a magnet for magnetically engaging the metal base. There is further included means for shifting the magnetically engaged base translationally, comprising a shuttle movable relative to the pin means, the shuttle carrying the base engaging means to and from the severing locus for removing the base from the severing locus and to the receptacle for recycling the base means.

The shifting further comprises, with reference to shifting the canister, canister shifting means comprising means to engage the canister free of the base, the canister shifting means being shiftable translationally in canister engaged relation for engaging and translationally shifting the canister from the severing locus to the receptacle for recycling, the engaging means typically comprising clamping means for clamping the canister.

The apparatus further includes means for shifting the clampingly engaged canister translationally, comprising a shuttle movable relative to the pin means, the shuttle carrying the canister clamping means to and from the severing locus for removing the canister from the severing locus and to the receptacle for recycling.

The metal base engaging means carried by the shuttle for engaging and shifting the metal base, e.g. by magnetically engaging the base, operates simultaneously with clamping and shifting the canister from the pin means locus to respective receptacles for recycling.

Typically, the shuttle moves back and forth along a predetermined path, the severing locus and the recycling receptacles being spaced along the path. With further reference to the path, there is included track means defining the predetermined path, the track means being disposed above the severing locus and spaced therefrom a distance at least twice the vertical extent of the canister. In this and like embodiments, the metal base engaging magnet and the canister clamping means are separated at a fixed spacing along the shuttle, the spacing corresponding to the spacing of the recycling receptacles, whereby the metal bases and the canisters are simultaneously depositable in their respective recycling receptacles by release thereof from the magnet and clamping means respectively. Typically, the track means further defines the predetermined path to extend to a loading locus located across the severing locus from the recycling receptacles, filters to be disassembled being picked up at the loading locus by the clamping means carried by the shuttle. In such embodiments, the magnetic engaging means is spaced from the clamping means on the shuttle to register with the severing locus when the clamping means is in registry with the loading locus, whereby the metal base from a first canister is magnetically engaged at the severing locus while a second filter with base and canister intact is loaded at the loading locus; and, the shuttle with its clamping means and its magnetic engaging means is shiftable along the predetermined path to the severing locus to bring the filter from the loading locus to the severing locus for retention by the pin means and cutting blade engagement for cutting the base free of the canister while simultaneously shifting a previous filter metal base from the severing locus for further shifting to a recycling receptacle in conjunction with subsequent shifting of the filter canister from the severing locus.

In another embodiment, the shifting means includes filter element shifting means comprising means to engage the filter element after separation of the filter canister therefrom, and to shift the filter element translationally from the severing locus. Thereafter, the filter element is shifted from the severing locus to a recycling receptacle in timed relation with shifting of the filter canister and the base from the severing locus, whereby the severing locus is unblocked by canister or base when shifting the filter element.

The filter element shifting means comprises an extensible arm, filter element engaging means carried on the arm, and means to extend the arm, the arm extending means being rocked about a pivot to lift an engaged filter element over the pin means.

In another embodiment, the invention provides apparatus for the disassembly and recycling of oil filters comprising a perforated metal base fixed to a canister and a filter element within the canister, the apparatus comprising a severing locus having disposed therein cutting means comprising a cutting blade adapted to engage the filter canister adjacent the filter base, means to shift the filter element from the severing locus; a loading locus at a fixed spacing before the severing locus; and a series of recycling receptacles beyond the severing locus; a shuttle movable along a predetermined path between the loading locus, the severing locus and the recycling receptacles, the shuttle carrying a canister shifting means and a base shifting means; a filter element shifting means adjacent the severing locus; the canister shifting means and the base shifting means being in fixed spaced relation on the shuttle corresponding to the fixed spaced relation of the loading locus to the severing locus and the severing locus to the recycling receptacles enabling successive pairs of registrations of the canister and base shifting means with the loading and severing locus and with the receptacles, whereby translational movement of the shuttle along the predetermined path registers the canister shifting means with the loading locus for pickup of a filter assembly while the base shifting means registers with the severing locus for pickup of a severed base, and further translational movement of the shuttle along the redetermined path registers the canister shifting means with the severing locus for depositing the canister for severing of the base from the canister and removing the severed canister from the severing locus, and the base shifting means with the apparatus beyond the severing means, and still further translational movement of the shuttle along the predetermined path registers the canister shifting means with a severed canister beyond the severing locus for deposit of the severed canister and the base in respective recycling receptacles to clear the shifting means for return to the loading locus and the severing locus for a further cycle.

In another embodiment, the invention provides an apparatus for disassembling and recycling the filter, perforated base and canister components of oil filters of internal combustion engines, comprising longitudinally separated facilities for receiving, disassembling and recycling oil filter components, shuttle means interconnecting the facilities, the shuttle means comprising a track extending between facilities, a shuttle car movable along the track, and first and second operating heads carried by the shuttle car in longitudinally spaced relation corresponding to the longitudinal separation of the facilities the first operating head comprising means to transfer the filter or filter canister, the second operating head comprising means to transfer the filter base; and a third operating head comprising means to transfer the filter element; the first and second operating heads cooperating to deliver an oil filter from the receiving facility to the disassembling facility with the first operating head, while transferring a separated filter base from the disassembling facility toward the recycling facility with the second operating head, to transfer a separated canister from the disassembly facility to the recycling facility with the first operating head, while transferring the separated filter base to the recycling facility with the second operating head, and to clear the disassembly facility of separated filter elements after filter disassembly and before further delivery of filters to be disassembled with the third operating head.

In the last mentioned embodiment, typically: The shuttle comprises an elongated structure adapted to be shifted along the track in timed relation with operations of the operating heads; The first operating head comprises clamping means adapted to clamp the filter canister; The disassembling facility comprises means to cut the canister from the base, the first operating head clamping means being adapted to temporarily release the filter canister in the dissembling facility during cutting, the first operating head having a magnetic guide means in continuous contact with the canister during cutting; The second operating head comprises a magnetic means adapted to engage the filter base for transfer; The third operating head comprises means to engage and shift the filter element from the disassembling facility, the third operating head being mounted for translational and vertical movement; And, the disassembling facility comprises a filter base retaining head comprising a rotatable stage mounting a series of pins adapted to engage corresponding perforations in the base in pin retained relation for rotating the base and attached canister, and cutting means cooperating with the rotating base to cut the canister from the base.

In this embodiment, typically, the shuttle comprises an elongated structure adapted to be shifted along the track in timed relation with operations of the operating heads, the first operating head comprises clamping means adapted to clamp the filter canister; the disassembling facility comprises means to cut the canister from the base, the first operating head clamping means being adapted to temporarily release the filter canister in the dissembling facility during cutting, the first operating head having a magnetic guide means in continuous contact with the canister during cutting, the second operating head comprises a magnetic means adapted to engage the filter base for transfer, the third operating head comprises means to engage and shift the filter element from the disassembling facility, suitably being mounted for translational and vertical movement sufficient to lift the filter element from the base in the pin-retained condition of the base, and the first and second operating heads are movable vertically from the shuttle to and from the facilities with which they are operatively associated.

In this embodiment, there may be further included a conveyor belt for delivering filters to be disassembled to the receiving facility.

The invention further contemplates the method of disassembling oil filters for internal combustion engines, the filters comprising a perforated base, a filter element and a canister, which includes shifting the filter with an operating head from a receiving facility to a disassembling facility, relatively rotating the filter in engagement with the operating head and a cutter adjacent the intersection of the filter canister and the filter base to sever the canister from the base, and lifting the severed canister from the base with the operating head.

In this and like method embodiments, in which the operating head is a first operating head, there is also included: Shifting a second operating head in tandem with the first operating head to shift the severed base from the disassembling facility while the first operating head is shifting a second filter to the disassembling facility, shifting the filter element exposed after shifting the severed canister from the disassembling facility in timed relation with the tandem movement of the first and second operating heads to clear the base of the filter element in advance of the second operating head shifting the severed base from the disassembling facility, and resiliently urging a bodily rotatable plurality of base engaging pins against the filter base at the disassembling facility for engagement with the base only at points of registration of perforations in the base with the pins.

In another embodiment of the invention method there is provided the method of universally retaining different oil filters at a cutting station, including setting the filter perforate base against a plurality of pins adapted to enter opposing base openings, and spring-loading the pins, for deflection by the base where there is n opposing base opening.

THE DRAWINGS

The invention will be further described in conjunction with the attached drawings in which.

PREFERRED MODES

Figure 1:
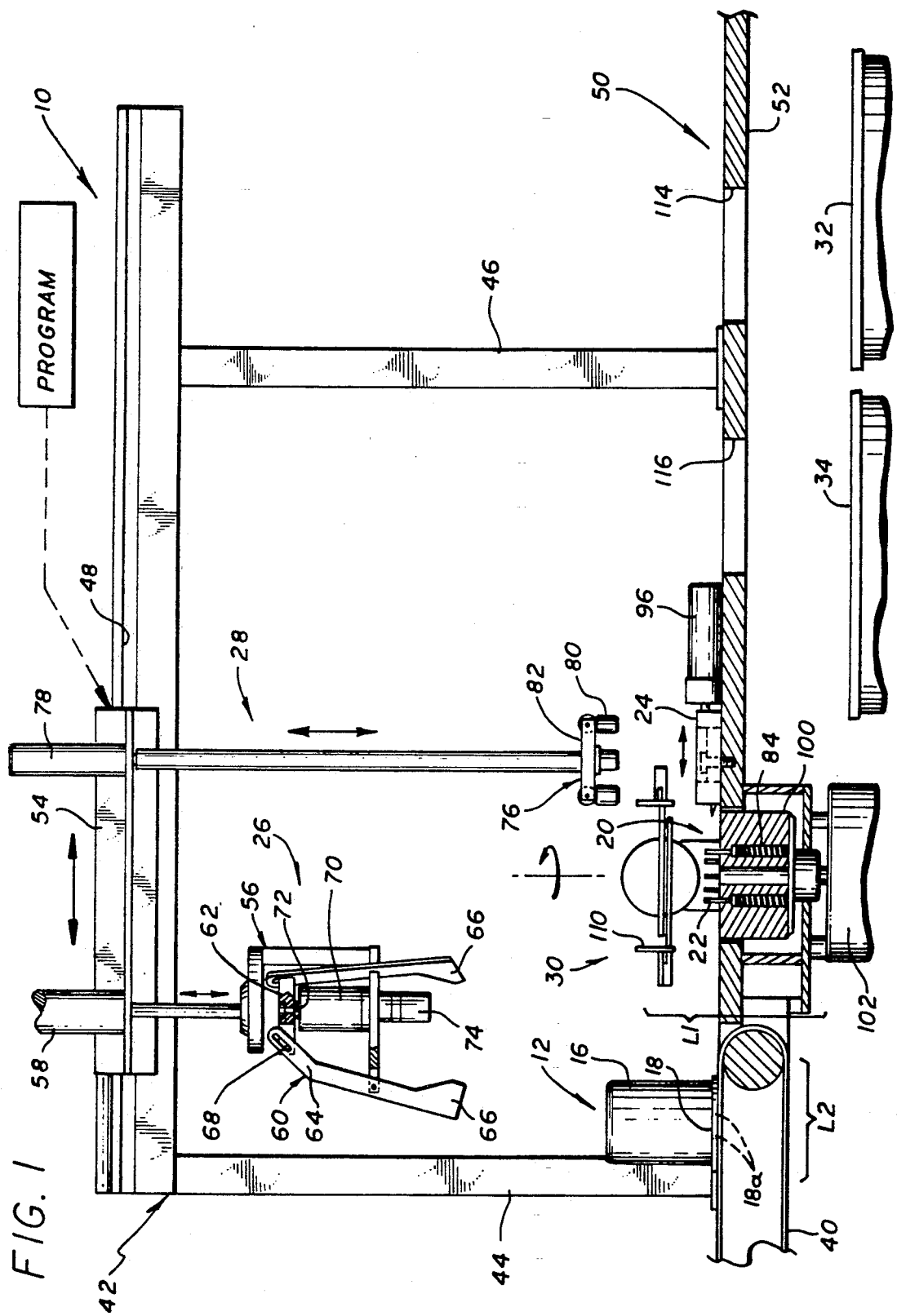
FIG. 1 is a side elevation of the apparatus, partly broken away to show underlying parts.

In overview, and with reference to the drawings in detail, FIGS. 1-7, the invention disassembly and recycling apparatus for oil filters is shown at 10. The oil filter 12 comprises a vertically extended filter element 14 (FIG. 5), a downwardly open canister 16 enclosing the filter element, and a perforated metal base 18 fixed across the canister opening in filter element securing relation. The apparatus defines a severing locus L1 at which filter retaining means 20 are provided. Filter retaining means 20 comprise pins 22 extending through the metal base 18 perforations 18a, cutting means 24 are disposed radially of the pins 22 and arranged as shown to cut the pin-retained base free 18 from the canister 16. Separate means 26, 28 and 30 are provided for shifting the base 18, canister 16 and filter element 14 from the severing locus L1 to receptacles 32, 34 and 36 (FIG. 6), respectively, for recycling.

The disassembly and recycling operation commences at loading locus L2. There, oil filters 12, gathered from service stations,m fleet operators and other sources are delivered in upright orientation by means not shown on conveyor belt 40. As earlier referenced, the oil filter 12 comprises a perforate base 18, a canister 16 generally crimped to the base, and within a filter element 14. The conveyor belt 40 is arranged to bring the oil filters 12 to the loading locus L2. The apparatus 10 includes a frame 42 one end of which is adjacent the end of conveyor belt 40. The frame 42 includes uprights 44, 46 which support a track 48 above a bed 50 defined by a plate 52. Shuttle 54, a substantial metal member, rides on track 48, driven by suitable means, such a air or liquid, or is driven electrically. The track 48 and shuttle 54 are arranged such that the shuttle may oscillate between the severing locus L1 and the loading locus L2, and as will be seen beyond the severing locus for removal of oil filter components to recycle receptacles 32, 34.

Figure 2:
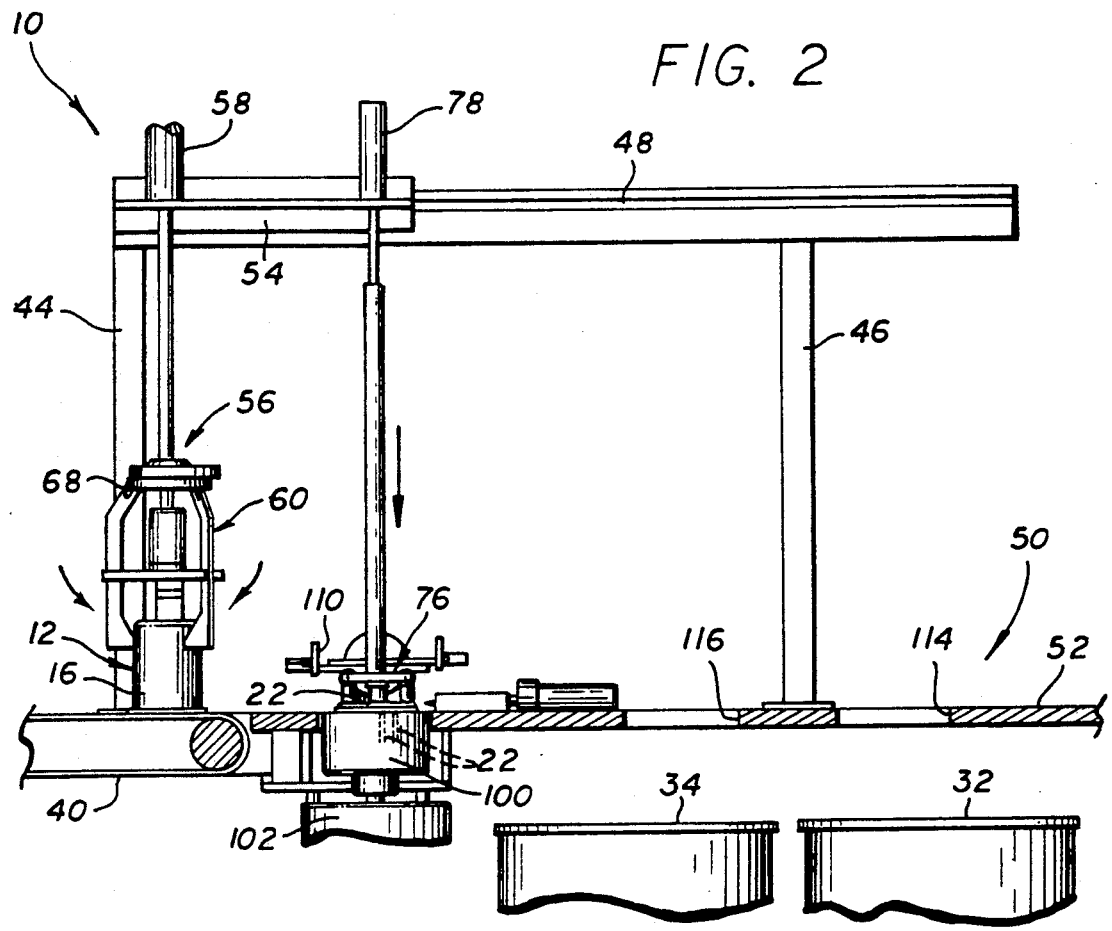
FIG. 2 is a view like FIG. 1 showing the apparatus at the commencement of a new cycle.

The shuttle 54 carries a first operating head 56 comprising a vertical motion cylinder and piston assembly 58, and a clamp 60 comprising a block 62 on which the slotted upper ends 64 of the clamp arms 66 are loosely captured by pins 68 extending from the block. The lower ends of clamp arms 66 are coupled to clamp cylinder 70 which extends or retracts relative to block 62 under the pressure of clamp piston 72 against the block and shifts the clamp arms 66 outward or inward respectively. Cf. FIGS. 1 and 2. Operating head 56 further comprises an magnet 74 centered in the clamp 60, for engaging the canister 16 during cutting operations, as will be described. For this purpose, the magnet 74 is mounted to clamp cylinder 70 in a manner to rotate on its own axis.

Shuttle 54 carries a second operating head 76 also for vertical motion. A cylinder and piston combination 78 serves to raise or lower the second operating head 76 relative to the bed 52. Operating head 76 comprises a grouping of small magnets 80 carried by plate 82 for gimbal motion to better adapt to varying surfaces on the filter metal bases 18, as will be further described.

The first and second operating heads 56, 76 are fixed in a predetermined longitudinally spaced relation defined by the shuttle 54. This spacing enables different functions of the apparatus to be accomplished by complementary spacing being used along the bed 52, as will now be described.

With particular reference to FIG. 2, at loading locus L2 the upright oil filter 12 from conveyor 40 is gripped by the clamp 60. The magnet 74 is generally not activated at this point, the clamp 60 being used to move the oil filter 12. It will be noted that second operating head 76 has moved with the first operating head 56, together in fixed relation on the shuttle 54. While the first operating head 56 is lowered by piston 58, the second operating head is lowered by piston 78. The second operating head magnets 80 are engaged with a base 18 from a previously processed filter 12, as earlier described. The value of the fixed spacing of the operating heads is thus shown. By moving the shuttle 54 to a location, the heads 56, 76 can perform simultaneously their separate functions.

Figure 3:
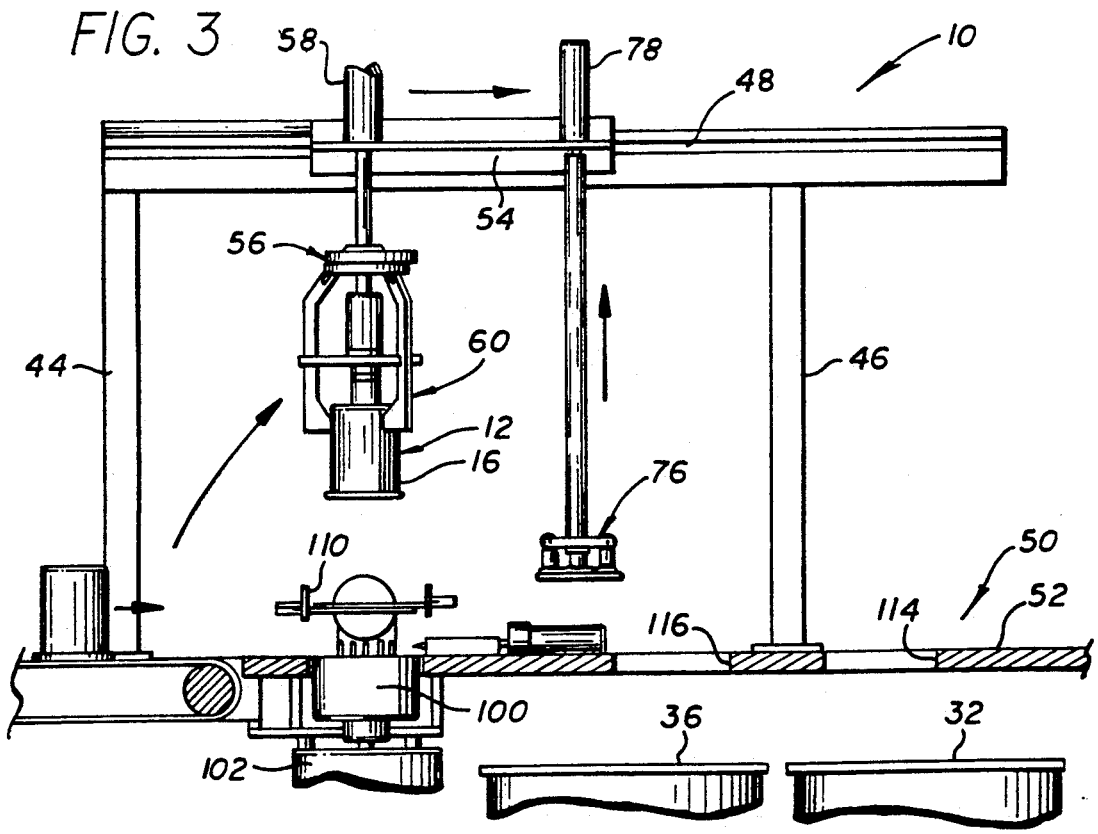
FIG. 3 is a view like FIG. 1, showing the oil filter being brought to the severing locus.

In FIG. 3, the first operating head 56 is lifted by piston 58, and second operating head 76 is lifted up by piston 78. The shuttle 54 is simultaneously drawn rearwardly along track 48, as shown. It will be noted that the previous filter base 18 is engaged with the second operating head magnets 80, and the new filter 12 is engaged by the clamp 60. Also shown is a further filter 12 being brought to locus L1 by the conveyor 40.

In addition, removal of the base 18 reveals an array of pins 22. These pins 22, as above noted, are spring loaded by coil springs 84 and resilient when deflected vertically. Pins 22 are arrayed circularly in keeping with the general configuration of filter bases 18. As is known, filter bases 18 are perforated in different patterns and spacings depending on filter purpose, size and brand. In order to accommodate as wide a variety of filters 12 as possible, a universal pin system is desirable, and thus numerous pins 22 in a universal pattern are provided. Pins 22 which do not register with a perforation opening in a base 18 would interfere with operation of the apparatus by precluding full seating of the oil filter on the pins 22, so all pins are spring mounted so as to deflect downward if there is no registration of a particular pin with a base perforation. See FIG. 2.

Figure 4:
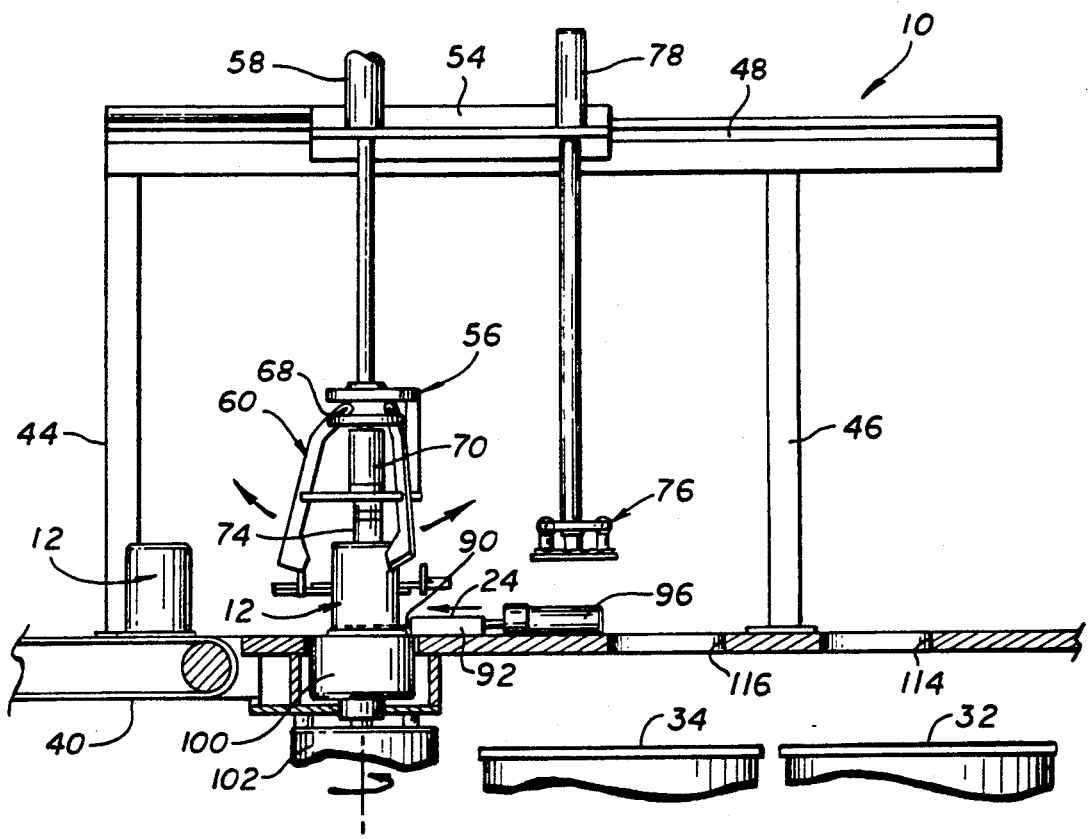
FIG. 4 is a view like FIG. 1, showing the oil filter at the severing station.

In FIG. 4, the first operating head 56 has brought the oil filter 12 down onto the pins 22 at severing locus L1. At this point the magnet 74 is energized providing support for the canister 16 portion of the oil filter 12. The clamp 60 is released from the oil filter 12. The cutting means 24 comprising cutting blade 90 held in support 92 is moved into engagement with the canister wall 94 of the oil filter 12 by operation of piston and cylinder 96.

The pins 22 are carried in a rotatable head 100 driven by a motor 102. Upon two or more of the pins 22 entering the base 18 perforations 18a, and energization of the magnet 74, the rotatable head 100 is rotated rapidly through several revolutions as necessary to sever the canister wall 94 at a point just above the base 18. In this manner, cutting of the more rugged base 18 is avoided in favor of the thin walled canister.

While this operation is conducted, the former filter base 18 is suspended above the bed 52 as shown from the second operating head 76 which has been moved vertically, and rearwardly, translationally, with the shuttle 54 as the first operating head 56 was moved into position above and opposite the severing locus L1. The second operating head magnets 80 support the base 18 in this position.

Figure 5:
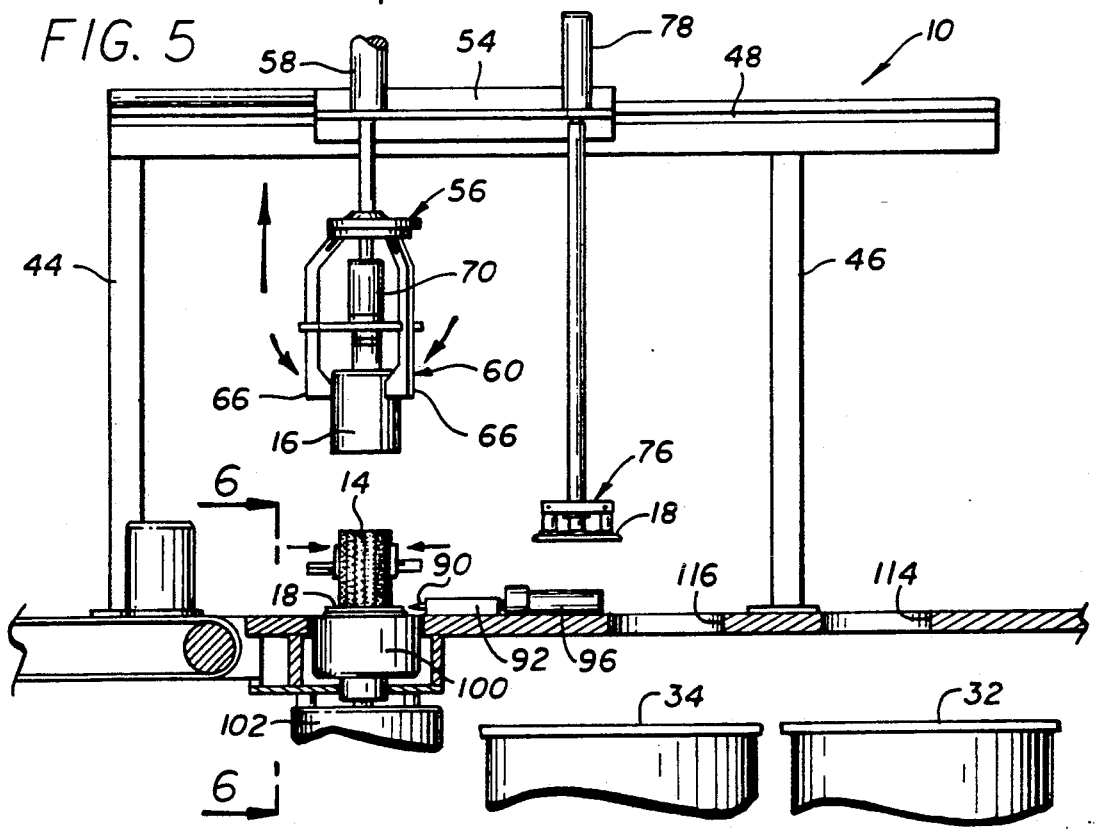
FIG. 5 is a view like FIG. 1, showing the canister being removed, exposing the oil filter element.

With reference to FIG. 5, the first operating head 56 has clamped the canister 16 now freed from the base 18 and lifted it vertically off the filter element 14. The second operating head 76 remains in place.

Figure 6:
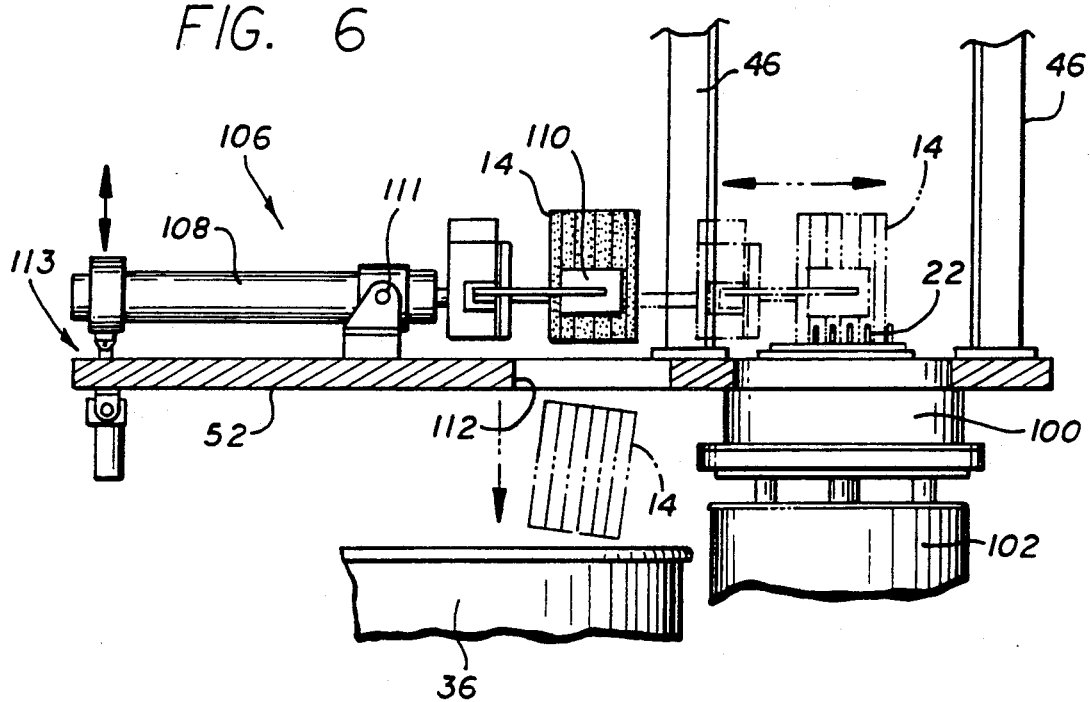
FIG. 6 is a side elevation view, showing the filter element being shifted to recycle; and, FIG. 7 is a view like FIG. 1, showing the base and the canister being shifted to recycle.

With reference to FIG. 6, the filter element 14 is shifted from is the severing locus L1 by third operating head 106. Operating head 106 comprises a cylinder and piston 108 mounted horizontally on bed 52 as shown. Jaws 110 are moved forward by the cylinder and piston 108 from a position of rest after the canister 16 has been lifted from the filter element 14, See FIG. 5. Jaws 110 are closed about the filter element 14, and the gripped filter element withdrawn and shifted by the cylinder and piston out of the severing locus L1 and into registration with a recycling receptacle 36 beneath aperture 112 in the bed 52. The jaws 110 are vertically shiftable to enable the filter element 14 to clear the upthrust pins 22 by provision of a pivot for the cylinder and piston at 111, and a cam-operated arm 113 to rock the piston and cylinder in a movement lifting the filter element off the pins 22. The filter element 14 is thus separated, segregated and collected for processing to remove residual oil and shredding into environmentally useful form.

The jaws 110 are then returned to their rest position for the next cycle.

Figure 7:
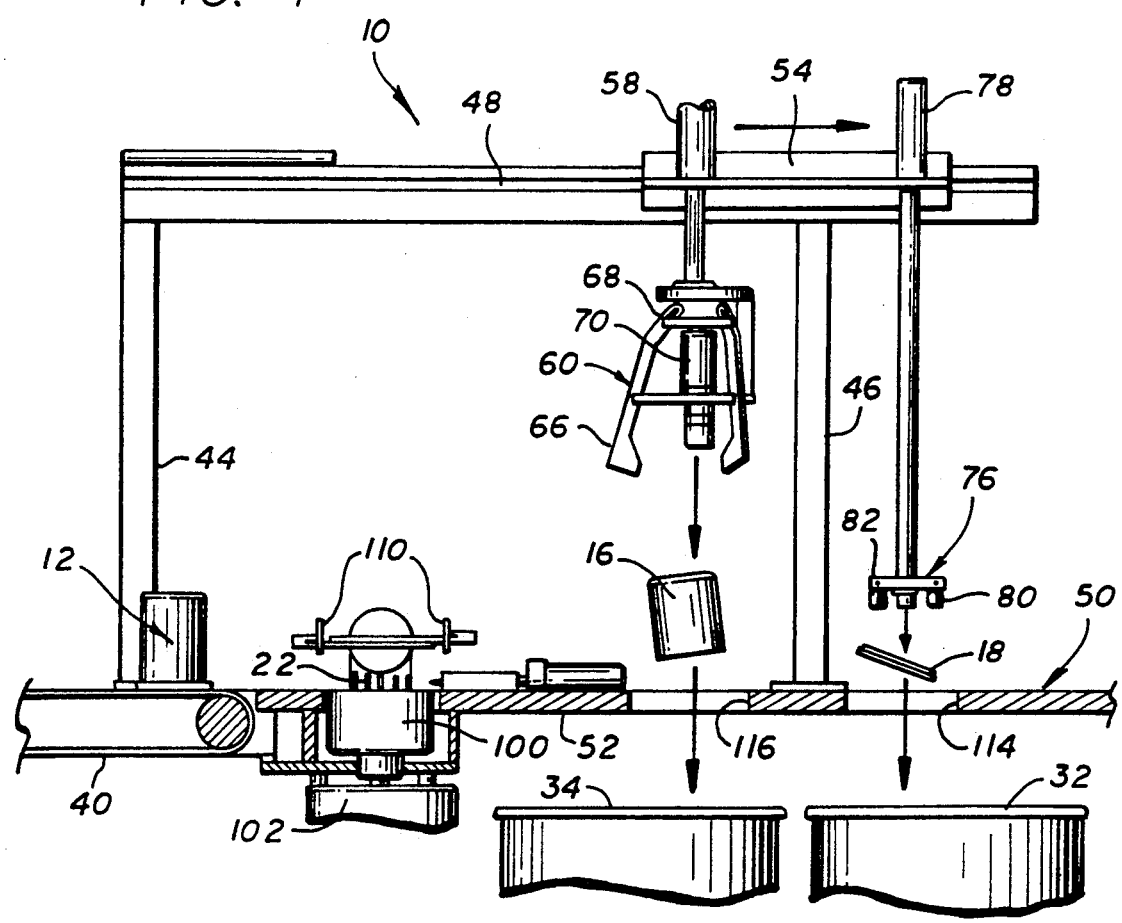

With reference to FIG. 7, the shuttle 54 is further moved translationally from the severing locus L1, now carrying the clamped canister 16 and the previous filter base 18, to shift these filter components into registry with their respective separation, segregation and collection receptacles 32, 34, as shown beneath apertures 114, 116 in the bed 52. At this point, the next filter 12 has been moved into position at the loading locus L2, as shown.

The sequencing of the described operations are readily controlled by a suitably programmed computer, as indicated in FIG. 1.

The invention thus provides a method and apparatus in which the disassembly of oil filters and diversion of disassembled components to appropriate recycle groups is conducted in a mechanized, repetitive way which is computer controlled and geared to vast quantities of units routinely being processed. The apparatus separates the oil filter components in an integrated fashion with disposal thereof, and shifts oil filters and oil filter components from station to station without human labor input, progressively disassembling the units into components, and directing the components into separate locations for recycle without need of further separating steps. The apparatus and method utilizes the perforate base of the typical oil filter to drive the filter for cutting operations severing the base from the canister above the base, and carried the units and unit components on a common shuttle between stations for successive operations after impaling the oil filters on a universal array of separately deflectable pins which extend through the perforate base in the pattern dictated by the pattern of perforations. The filter element is shifted from pin engagement by rocking the element upward off the pins. Magnets are used to shift the ferrous metal bases from their position of the pins, and clamping means carried by the shuttle are used to shift the unit and the canister portion of the unit at separate stages of the method.

We claim:

1. Disassembly and recycling apparatus for oil filters comprising a vertically extended filter element, a downwardly open canister comprising a wall enclosing said filter element, and a perforated metal base fixed across the canister opening in filter element securing relation, said apparatus comprising at a severing locus a filter retaining means including pin means extendible through said metal base perforations, cutting means disposed radially of said pin means and arranged to cut said metal base free from said canister, and individual means for shifting said base, said canister and said filter element to respective receptacles for recycling said metal base, said canister and said filter element.

2. Apparatus according to claim 1, including also positioning means for positioning said oil filter to receive said pins in said metal base.

3. Apparatus according to claim 1, in which said pin means comprises a plurality of pins opposing said metal base, at least two of said pins being adapted to register with and enter the perforations in said metal base in filter retaining relation.

4. Apparatus according to claim 3, in which said pins are deflectable by said metal base when not registered with a metal base perforation to permit entry into said metal base perforations by pins in registration therewith.

5. Apparatus according to claim 1, in which said pin means comprises a plurality of pins spring biased toward said metal base for entry into said base when in registration with perforations therein and deflection by said base when not in registration t herewith.

6. Apparatus according to claim 5, in which said plurality of pins is arranged in laterally spaced relation for retaining variously sized metal bases with different patterns of perforations, and each said pin is normally upstanding but axially deflectable against its spring bias by said metal base when not in registration with a metal base perforation.

7. Apparatus according to cl aim 1, in which said cutting means comprises a cutting blade adapted to cut through said canister at the canister wall adjacent said metal base while said metal base is retained by said pin means.

8. Apparatus according to claim 7, in which said cutting blade and canister wall are relatively movable for cutting said canister wall.

9. Apparatus according to claim 8, in which said canister is driven arcuately about its axis by said pin means inserted in said metal base, and said cutting blade cuts said canister wall to sever said metal base from said canister.

10. Apparatus according to claim 9, in which said filter canister moves through at least one rotation with said cutting means in cutting engagement therewith.

11. Apparatus according to claim 10, in which said cutting means comprises a cutting blade, and including also a rotatable stage supporting said pin means, and drive means including a shaft and motor driving said stage during cutting engagement of said cutting blade with said canister wall.

12. Apparatus according to claim 1, in which one of said shifting means comprises metal base shifting means comprising means to engage said metal base, said base engaging means being shiftable translationally in metal base engaged relation for engaging and translationally shifting said metal base from said severing locus to the receptacle for metal base recycling.

13. Apparatus according to claim 12, in which said base engaging means comprises a magnet for magnetically engaging said metal base.

14. Apparatus according to claim 13, including means for shifting said magnetically engaged metal base translationally, comprising a shuttle movable relative to said pin means, said shuttle carrying said metal base engaging means to and from said severing locus for shifting said metal base from said severing locus to the receptacle for recycling said metal base.

15. Apparatus according to claim 1, in which one of said shifting means comprises canister shifting means comprising means to engage said canister free of said base, said canister engaging means being shiftable translationally in canister engaged relation for engaging and translationally shifting said canister from said severing locus to the receptacle for canister recycling.

16. Apparatus according to claim 15, in which said engaging means comprises clamping means for clamping said canister.

17. Apparatus according to claim 16, including means for shifting said clampingly engaged canister translationally, comprising a shuttle movable relative to said pin means, said shuttle carrying said canister clamping means to and from said severing locus for shifting said canister from said severing locus to the receptacle for canister recycling.

18. Apparatus according to claim 17, including also metal base engaging means carried by said shuttle for engaging and shifting said metal base simultaneously with clamping and shifting of said canister from said severing locus to respective base and canister receptacles for recycling.

19. Apparatus according to claim 18, in which said metal base engaging means magnetically engages said base.

20. Apparatus according to claim 19, in which said shuttle moves back and forth along a predetermined path, said severing locus and said respective base and canister recycling receptacles being spaced along said path.

21. Apparatus according to claim 20, including also track means defining said predetermined path, said track means being disposed above said severing locus and spaced therefrom a distance at least twice the vertical extent of said canister.

22. Apparatus according to claim 21, in which said metal base engaging magnet and said canister clamping means are separated at a fixed spacing along said shuttle, said spacing corresponding to the spacing of said recycling receptacles, whereby said metal base and said canister are simultaneously depositable into their respective recycling receptacles by release thereof from said magnet and clamping means respectively.

23. Apparatus according to claim 22, in which said track means further defines said predetermined path to extend to a loading locus located across said severing locus from said base and canister recycling receptacles, wherein oil filters to be disassembled are picked up at said loading locus by said clamping means and carried by said shuttle to said severing locus.

24. Apparatus according to claim 23, in which said magnetic engaging means is spaced from said clamping means on said shuttle to register with said severing locus when said clamping means is in registry with said loading locus, whereby said metal base from a first canister is magnetically engaged at the severing locus while a second filter with base and canister intact is loaded at the loading locus.

25. Apparatus according to claim 24, in which said shuttle with its clamping means and its magnetic engaging means is shiftable along said predetermined path to said severing locus to bring said filter from said loading locus to said severing locus for retention by said pin means and cutting blade engagement for cutting said base free of said canister while simultaneously shifting a previous filter metal base from said severing locus for further shifting to a recycling receptacle in conjunction with subsequent shifting of said filter canister from said severing locus.

26. Apparatus according to claim 1, in which one of said shifting means comprises filter element shifting means comprising means to engage said filter element after separation of said filter canister therefrom, and to shift said filter element translationally from said severing locus.

27. Apparatus according to claim 26, in which said filter element is shifted from said severing locus to a recycling receptacle in timed relation with shifting of said filter canister and said base from said severing locus, whereby said severing locus is unblocked by canister or base when shifting said filter element.

28. Apparatus according to claim 27, in which said shifting means comprises an extensible arm, said filter element engaging means being carried on said arm, and means to extend said arm, said arm extending means being rocked about a pivot to lift an engaged filter element over said pin means.

29. Apparatus for the disassembly and recycling of oil filters comprising a perforated metal base fixed to a canister and a filter element within the canister, said apparatus comprising a severing locus having disposed therein cutting means comprising a cutting blade adapted to engage the filter canister adjacent the metal base, means to shift the filter element from the severing locus; a loading locus at a fixed spacing before said severing locus; and a series of recycling receptacles beyond said severing locus; a shuttle movable along a predetermined path between said loading locus, said severing locus and said recycling receptacles, said shuttle carrying a canister shifting means and a base shifting means; a filter element shifting means adjacent said severing locus; said canister shifting means and said base shifting means being in spaced relation on said shuttle corresponding to said spaced relation of said loading locus to said severing locus and said severing locus to said recycling receptacles enabling registration of said canister and base shifting means with said loading and severing locus and subsequent registration with said receptacles, whereby translational movement of said shuttle along said predetermined path registers said canister shifting means with said loading locus for pickup of a filter assembly while said base shifting means registers with said severing locus for pickup of a severed base, and further translational movement of said shuttle along said predetermined path registers said canister shifting means with said severing locus for depositing said canister therein and thereafter removing the severed canister from the severing locus, and still further translational movement of said shuttle along said predetermined path registers said canister shifting means with a canister recycling receptacle and said base shifting means with a base recycling receptacle such that said canister and said base can be deposited into their respective receptacles, whereby said shifting means is cleared of said canister and said base for return to said loading locus and said severing locus for a further cycle.

30. Apparatus for disassembling and recycling the filter element, perforated base and canister components of oil filters of internal combustion engines, comprising longitudinally separated facilities for receiving, disassembling and recycling oil filter components, shuttle means interconnecting said facilities, said shuttle means comprising a track extending between facilities, a shuttle car movable along said track, and first and second operating heads carried by said shuttle car in longitudinally spaced relation corresponding to the longitudinal separation of said facilities; said first operating head comprising means to transfer the canister, said second operating head comprising means to transfer the base; and a third operating head comprising means to transfer the filter element; said first and second operating heads cooperating to deliver an oil filter from the receiving facility to the disassembling facility with the first operating head, while transferring a separated base from the disassembling facility toward the recycling facility with the second operating head, to transfer a separated canister from the disassembly facility to the recycling facility with the first operating head, while transferring the separated base to the recycling facility with the second operating head; said third operating head clearing the disassembly facility of separated filter elements after filter disassembly and before further delivery of oil filters to be disassembled.

31. Apparatus according to claim 30, in which said shuttle car comprises an elongated structure adapted to be shifted along said track in timed relation with operations of said operating heads.

32. Apparatus according to claim 30, in which said first operating head comprises clamping means adapted to clamp said canister.

33. Apparatus according to claim 32 in which said disassembling facility comprises means to cut said canister from said base, and in which said first operating head clamping means is adapted to temporarily release said canister in said disassembling facility during cutting, said first operating head having a magnetic guide means in continuous contact with said canister during cutting.

34. Apparatus according to claim 30, in which said second operating head comprises a magnetic means adapted to engage said base for transfer.

35. Apparatus according to claim 30, in which said third operating head comprises means to engage and shift said filter element from said disassembling facility.

36. Apparatus according to claim 35, in which said third operating head is mounted for translational and vertical movement.

37. Apparatus according to claim 30, in which said disassembling facility comprises a base retaining head comprising a rotatable stage carrying a series of pins adapted to engage corresponding perforations in said base in pin retained relation for rotating said base and attached canister, and cutting means cooperating with said rotating base to cut the canister from said base.

38. Apparatus according to claim 37, in which said shuttle car comprises an elongated structure adapted to be shifted along said track in timed relation with operations of said operating heads.

39. Apparatus according to claim 38, in which said first operating head comprises clamping means adapted to clamp said canister.

40. Apparatus according to claim 39 in which said disassembling facility comprises means to cut said canister from said base, and in which said first operating head clamping means is adapted to temporarily release said canister in said disassembling facility during cutting, said first operating head having a magnetic guide means in continuous contact with said canister during cutting.

41. Apparatus according to claim 40, in which said second operating head comprises a magnetic means adapted to engage said base for transfer.

42. Apparatus according to claim 41, in which said third operating head comprises means to engage and shift said filter element from said disassembling facility.

43. Apparatus according to claim 42, in which said third operating head is mounted for translational and vertical movement sufficient to lift said filter element from said base in the pin-retained condition of said base.

44. Apparatus according to claim 43, including also a conveyor belt for delivering filters to be disassembled to said receiving facility.

45. Apparatus according to claim 43, in which said first and second operating heads are movable vertically from said shuttle car relative to said facilities.

* * * * *